United States Patent
Gray et al.

[11] Patent Number: 5,997,033
[45] Date of Patent: Dec. 7, 1999

[54] ADAPTIVE AIRBAG INFLATION METHOD AND APPARATUS

[75] Inventors: Charles Allen Gray, Noblesville; James Hill Brogoitti, Russiaville; David R. Little, Kokomo, all of Ind.

[73] Assignee: Delco Electronics Corp., Kokomo, Ind.

[21] Appl. No.: 08/964,006

[22] Filed: Nov. 4, 1997

[51] Int. Cl.[6] .................................................. B60R 21/32
[52] U.S. Cl. ............................................................ 280/735
[58] Field of Search ................................. 280/735, 736, 280/739, 733.1; 701/45, 46, 74

[56] References Cited

U.S. PATENT DOCUMENTS

| | | | |
|---|---|---|---|
| 5,074,583 | 12/1991 | Fujita et al. | 280/735 |
| 5,256,904 | 10/1993 | Tohbaru | 280/735 |
| 5,330,266 | 7/1994 | Gentry et al. | 280/735 |
| 5,439,249 | 8/1995 | Steffens, Jr. et al. | 280/735 |
| 5,490,069 | 2/1996 | Gioutsos et al. | 280/735 |
| 5,559,697 | 9/1996 | Wang | 701/45 |
| 5,739,757 | 4/1998 | Gioutsos | 280/735 |
| 5,785,347 | 7/1998 | Adolph et al. | 280/735 |
| 5,821,633 | 10/1998 | Burke et al. | 701/45 |
| 5,868,423 | 2/1999 | Takimoto et al. | 701/45 |

*Primary Examiner*—Kevin Hurley
*Assistant Examiner*—Michael Britton
*Attorney, Agent, or Firm*—Jimmy L. Funke

[57] ABSTRACT

The airbag system includes in addition to conventional crash sensing apparatus seat sensors to gauge occupant mass, an occupant position sensor and a vehicle speed sensor. Desired initial restraining force is calculated from speed at impact and the occupant's mass, and an appropriate degree of inflation is effected. The occupant speed is continuously calculated from the position sensor signal and the vehicle speed. A target speed profile is established based on an estimated restraint period and the vehicle speed, and an airbag vent is varied to control the occupant speed to the target speed. The target speed profile is adjusted as a function of passenger compartment acceleration to account for vehicle speed variations and for vehicle crush.

11 Claims, 3 Drawing Sheets

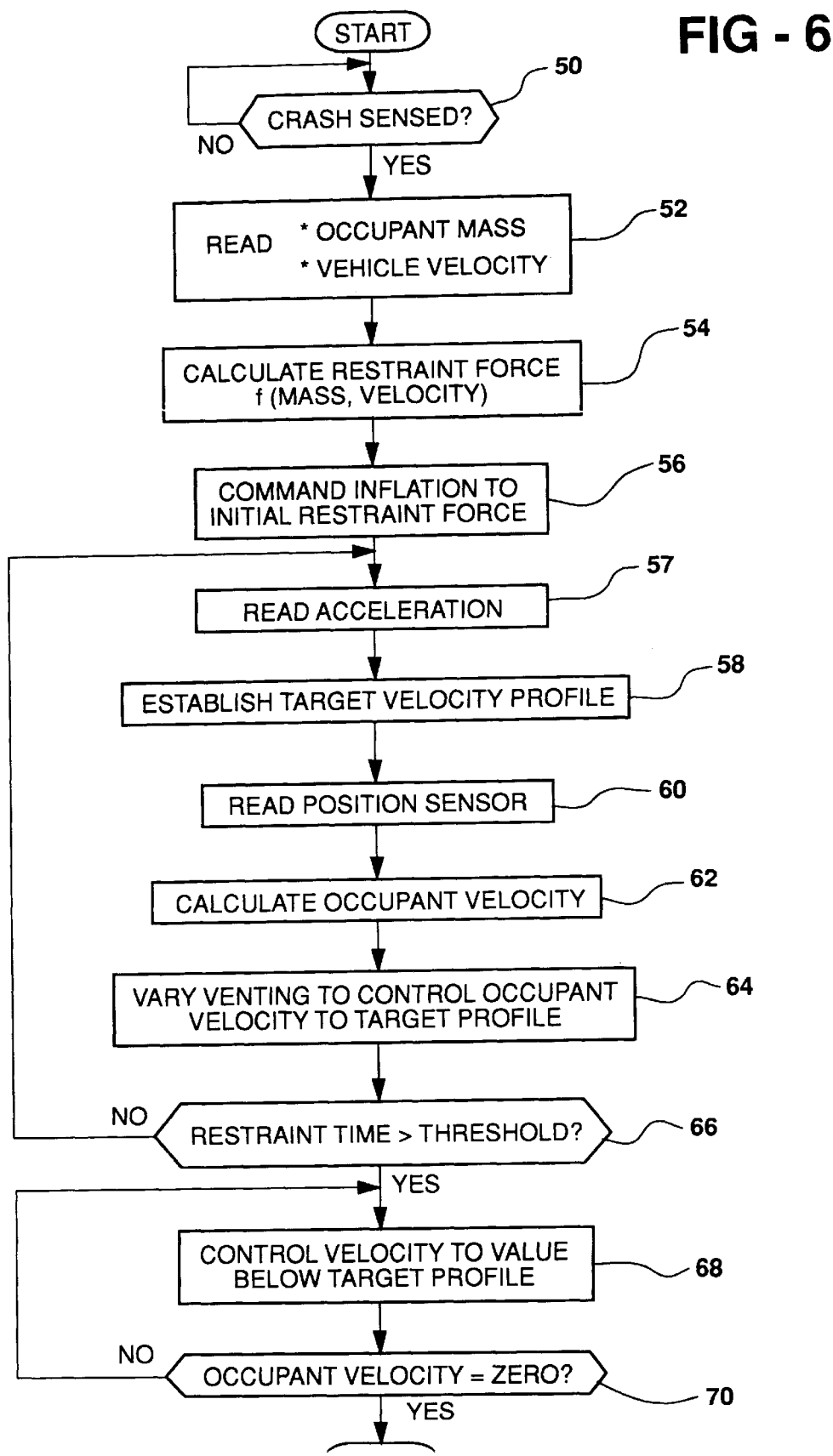

ADAPTIVE AIRBAG INFLATION METHOD AND APPARATUS

FIELD OF THE INVENTION

This invention relates to supplemental inflatable restraint or airbag systems and particularly to such a system and method which adapts to the momentum of an occupant

BACKGROUND OF THE INVENTION

Airbag systems in common usage typically have a fixed inflation rate followed by a deflation rate determined by bag porosity and vents in the bag as well as by the momentum of the occupant. The accompanying restraint forces are generally sufficient to cushion the crash impact for a large person during a severe crash. Such high restraint forces are unnecessary for less severe crashes or for smaller people, and are often undesirable for a small person particularly when out of the normal seating position. Ideally, the inflated airbag will gradually collapse in a manner to maintain an effective and uniform force throughout its deflation period, and that it will prevent contact of the occupant with the steering wheel or other vehicle structure.

It has been proposed, for example in the U.S. patent application Ser. No. 08/695,814, filed Aug. 5, 1996 by Liu entitled "Control Method for Variable Level Airbag Inflation" assigned to the assignee of this invention, to inflate the airbag in a selected number of stages according to crash severity. This does not take into account the mass of the occupant nor does it ensure that the restraint force is uniformly applied throughout the airbag deflation.

SUMMARY OF THE INVENTION

It is therefore an object of the invention to control airbag inflation and deflation to suit the restraint need of the occupant. Another object is to deploy the airbag with restraint force appropriate to the energy of the occupant and to control deflation according to the momentum of the occupant.

An airbag system has variable inflation airbags such as bags with multiple inflators or pyrotechnically controlled venting of the inflator so that more than one initial restraint force is available upon deployment. The airbags also have variable venting so that the deflation can be controlled. The system has seat sensors or the like to measure the mass of the occupant, and an occupant position sensor which tracks occupant position throughout the crash event. An electronic controller with a conventional frontal impact sensor and a microprocessor determines whether to deploy the airbags. An algorithm determines the required initial restraint force based on the occupant's mass and velocity (same as vehicle velocity at impact). A number of inflators are fired as required to attain the initial restraint force. Then a deceleration rate suitable to arrest the occupant within the space of the airbag is determined and the corresponding target velocity profile is established. The occupant velocity as determined from frequent position measurements is controlled to substantially follow the target velocity profile. The velocity control is possible by electronically varying the venting of the airbag.

BRIEF DESCRIPTION OF THE DRAWINGS

The above and other advantages of the invention will become more apparent from the following description taken in conjunction with the accompanying drawings wherein like references refer to like parts and wherein:

FIG. 6 is a flow chart illustrating a control algorithm according to the method of the invention.

DESCRIPTION OF THE INVENTION

Figure 1:
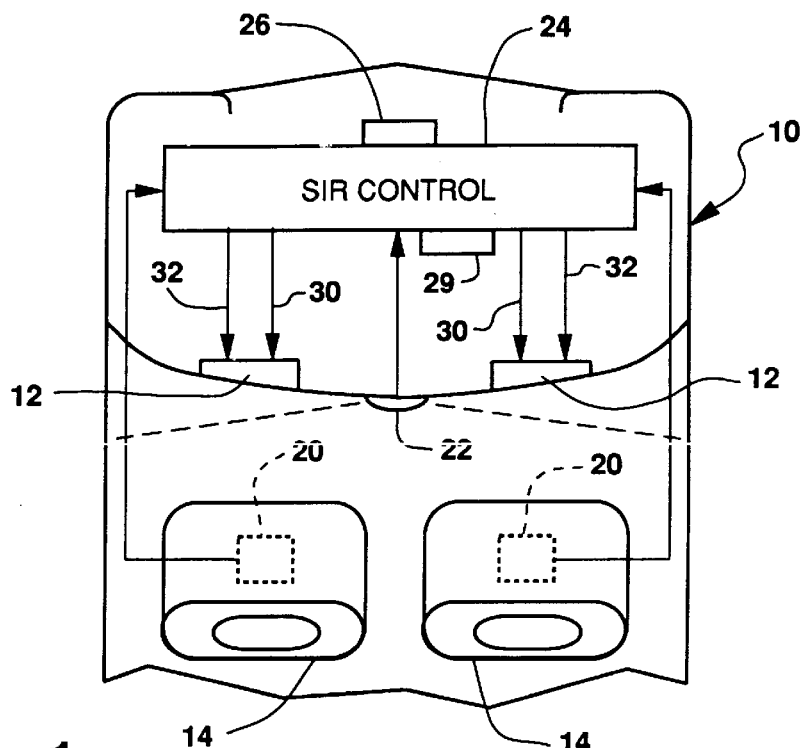
FIG. 1 is a schematic view of an airbag system in a vehicle according to the invention.
Figure 2:
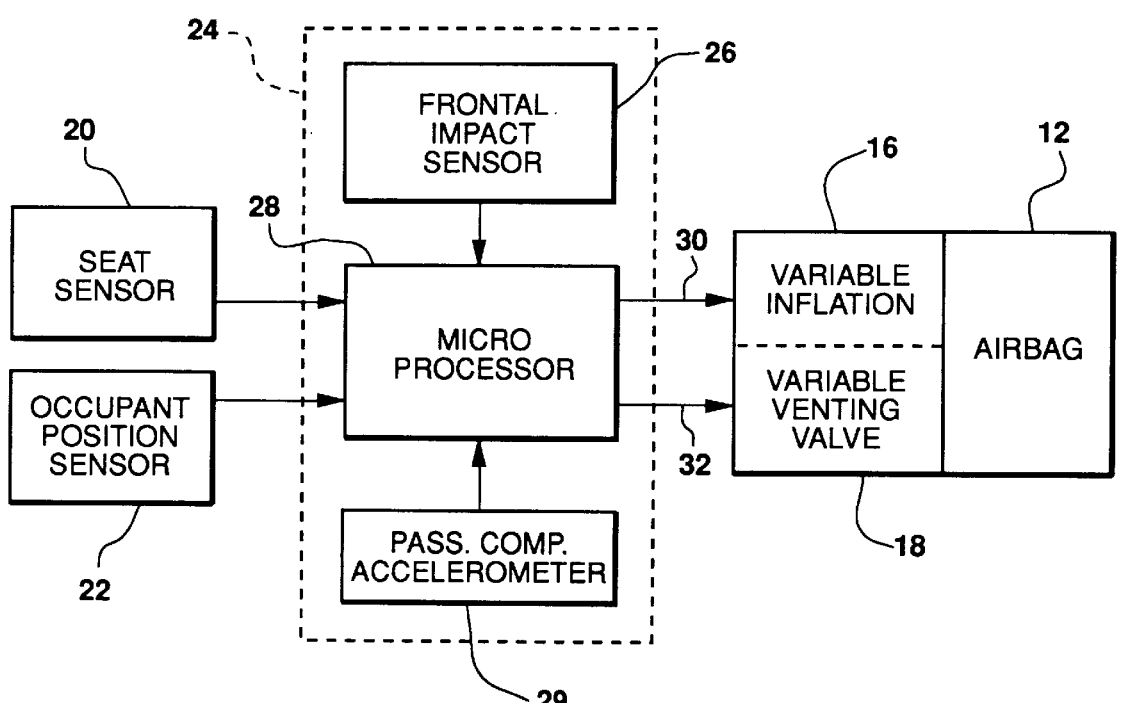
FIG. 2 is a schematic view of the control for the airbag system of FIG. 1.

Referring to FIGS. 1 and 2, a vehicle 10 has airbags 12 located in front of seats 14. The airbags include variable inflation 16 and a variable venting valve 18. The variable inflation may be, for example, multiple inflators which are selectively fired to attain the necessary restraint force. If each airbag has four inflators, from one to four will be ignited, depending on the crash severity as defined by occupant velocity and mass. Variable venting employs an electronically controlled vent valve 18 which rapidly changes effective vent area when a signal is developed requiring a change in velocity. Each seat 14 has a sensor 20 such as a pressure sensor or a strain gauge which measures the mass of the occupant. An occupant position sensor 22 which may incorporate infrared, electrostatic or ultrasonic technology is mounted to sense the position of each occupant throughout the crash.

An electronic controller 24 including a frontal impact sensor 26, a passenger compartment accelerometer 29 and a microprocessor 28 incorporates a known algorithm to evaluate crash severity and determine whether to deploy the airbags. The frontal impact sensor includes an accelerometer mounted near the front bumper of the vehicle to assess the initial impact in a frontal crash. The frontal impact sensor derives the initial crash velocity of the vehicle from the acceleration and sends that data along with the acceleration reading and a deployment decision to the microprocessor 28. The controller 24 also includes another accelerometer 29 mounted in or near the passenger compartment which measures acceleration throughout the crash. The microprocessor 28 receives inputs from the seat sensor and the occupant position sensor as well as vehicle velocity from the frontal sensor 26 and acceleration data from the passenger compartment accelerometer 29. The microprocessor is programmed to determine the desired inflation rate and to signal via line 30 the number of inflators to ignite, and to determine the desired deceleration or target velocity profile and signal the variable venting via line 32.

Figure 3:
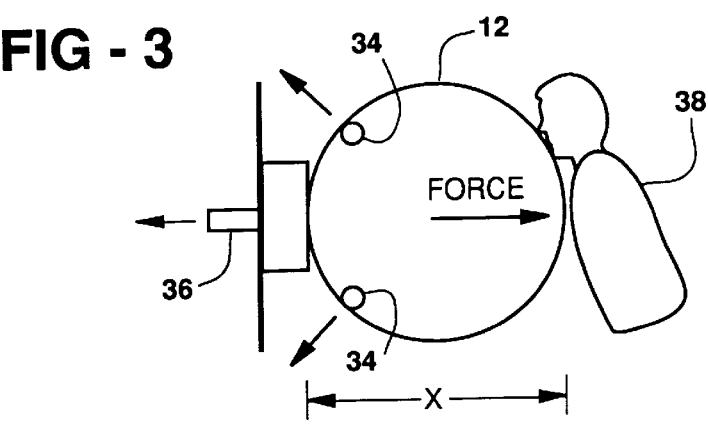
FIG. 3 is a diagram of occupant interaction with an airbag having variable venting.

An equation which is useful to determine the restraint force sets the kinetic energy of the occupant equal to the energy dissipated by the airbag or ½ Mass*Velocity$^2$=∫ Force dx, where mass is occupant mass, velocity is the velocity of the occupant 38, the force is the restraining force provided by the restraint system including the airbag, and the integrated dx (or x) is the distance over which the force acts as the occupant moves forward against the collapsing bag as indicated in FIG. 3. The occupant mass is measured by the seat sensor and the occupant velocity is assumed to be initially the same as the vehicle velocity at the time of impact, and is subsequently updated every 2 ms by monitoring the output of the occupant position detector. The initial airbag restraint force is a function of the mass of gas provided in filling the airbag, and the continuing force during deflation is determined by the fixed vent openings 34 and the electronically controlled variable vent aperture 36. Since the maximum distance x is fixed for a given vehicle installation, the desired force for initial restraint can be determined.

Figure 4:
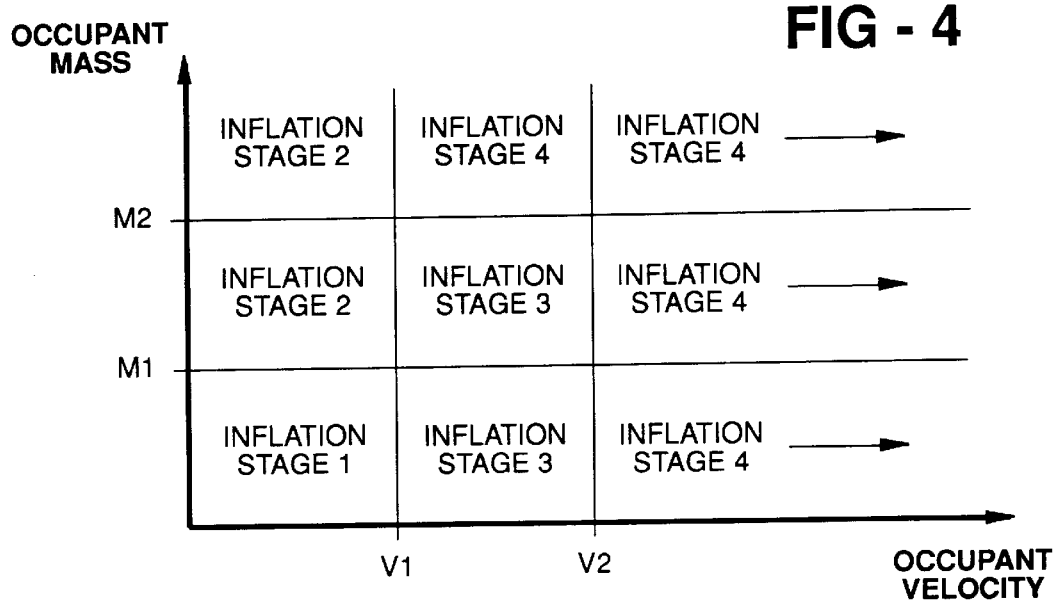
FIG. 4 is a matrix airbag inflation versus mass and velocity parameters.

For a given occupant mass the initial force can be selected based on the vehicle velocity. Because the velocity term is squared it is dominant and may require the maximum force when velocity is high even for small occupants. A matrix or table as shown in FIG. 4 is constructed for three mass ranges defined by occupant mass threshold M1 and M2, and three velocity ranges defined by velocity thresholds V1 and V2. For this illustration the airbag is equipped with four inflators such that inflation stage 1 uses one inflator, stage 2 uses two inflators, etc. For the high speed range, above V2, all four inflators are triggered; for the intermediate range three inflators are triggered for mass below M2 and four inflators for mass above M2; and for low speeds below V1, one inflator is used for mass below M1 and two inflators for mass above M1. For various systems the numbers of inflators and the number of mass and speed ranges may vary depending on the control desired or required. The mass and velocity limits in the matrix should be chosen so that the initial inflation force times the distance is slightly higher than the occupant energy term ½ $mv^2$, assuring that the airbag is inflated sufficiently to prevent occupant contact with the vehicle.

Figure 5:
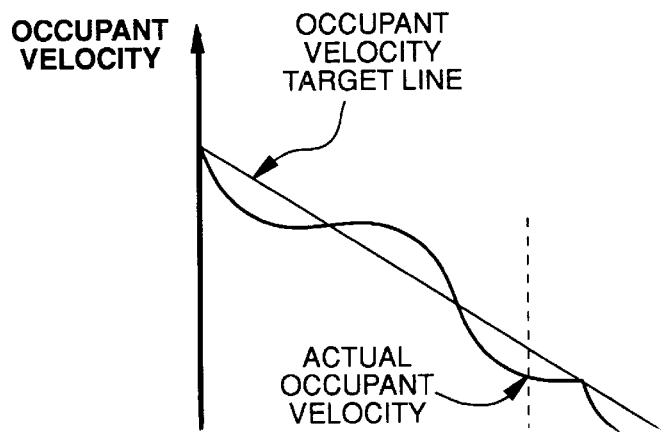
FIG. 5 is a graph of target velocity and actual velocity achieved by closed loop venting control.

After initial inflation the restraint force is managed by controlling the venting. It can be shown that maximum restraint efficiency is achieved by producing a constant deceleration of the occupant, resulting in a straight velocity target line from vehicle speed to zero as shown in FIG. 5. Typically the time for deceleration or total restraint time can be nominally chosen as 150 ms, or it can be estimated from the vehicle speed at impact. In any event the deceleration is readily calculated from the estimated restraint time and the vehicle speed to establish the target velocity profile. The target profile is periodically updated using passenger compartment acceleration to account for vehicle crush and change in vehicle velocity. A closed loop control is effective to control the actual occupant velocity to the target profile. The measured occupant speed is compared to the target speed and if the actual velocity is decreasing too fast the vent aperture is increased to bring the occupant velocity toward the target line; similarly if the actual velocity is decreasing too slowly, the vent aperture is decreased. Thus the actual velocity will vary about the target line. At some calibratable time, say 100 ms, it is desirable to alter the control to assure that at the end of the time the actual velocity is not above the target line to ensure that the restraining force is sufficient to arrest the occupant in less than the full restraining distance. This assures avoiding occupant contact with the vehicle.

Referring to FIG. 6, a flow chart generally illustrates the algorithm which carries out the airbag control. The functional description of each block in the chart is accompanied by a number in angle brackets <nn> which corresponds to the reference number of the block. Such angle brackets provide a convenient short-hand way of referring to a particular flow chart block in the following description, and of course do not appear in the drawings. If a crash is sensed <50> the values of occupant mass, occupant position and the vehicle velocity are read <52>. Then the initial restraint force or inflation stage is calculated from the mass and velocity <54> as indicated in FIG. 4 and the appropriate inflation command is issued <56> thereby attaining the required initial restraint force. Next the passenger compartment acceleration is read <57>, and then the target velocity profile is estimated from the vehicle speed and an estimate of the total restraint time <58>. Since the restraint time cannot be accurately known in advance the target velocity can in successive program loops be adjusted in accordance with the passenger compartment acceleration to reflect variation of vehicle speed during the impact and also to account for vehicle crush. The occupant position sensor is read at many points during the deflation period <60> and at each point the actual occupant velocity is calculated on the basis of the vehicle speed at the time of impact and the subsequent displacement of the occupant <62>. The occupant velocity is substantially controlled to the current target velocity by adjusting the variable vent of the airbag <64> until the elapsed restraint time reaches a threshold, about 100 ms, <66> and for the remaining time the actual velocity is held below the target velocity line <68> to ensure that the restraint force continues until the end of the restraint time and the occupant will not contact the steering wheel or other vehicle structure. The velocity control continues until the occupant velocity reaches zero <70>.

It will thus be seen that by the expedients of adding an occupant position sensor and a seat pressure or weight sensor, as well as equipping the airbag with variable inflation capability and controllable venting, the airbag deployment can be improved to afford suitable force over a range of vehicle speeds and occupant sizes and further to optimally control the force during airbag deflation to maintain a somewhat constant force throughout the restraint period.

The embodiments of the invention in which an exclusive property or privilege is claimed are defined as follows:

1. In an airbag system having occupant detection means, airbag inflation control, and airbag deflation control, the method of controlling an airbag in the event of a crash comprising the steps of:

determining the approximate mass of an occupant;

measuring vehicle speed at the time of impact;

calculating an initial airbag restraining force based on the occupant mass and the vehicle speed;

inflating the airbag to achieve the initial airbag restraining force;

periodically determining a velocity of the occupant subsequent to airbag inflation; and controlling deflation of the airbag as a function of the periodically determined occupant velocity.

2. The method as defined in claim 1 wherein the airbag deflation control includes a variable venting aperture, and wherein:

the step of controlling deflation comprises varying the venting aperture as a function of the periodically determined occupant velocity to achieve a controlled occupant deceleration.

3. The method as defined in claim 1 wherein the step of controlling deflation includes the steps of:

establishing a total restraint time;

determining a desired occupant deceleration for bringing the occupant to rest within the total restraint time; and deflating the airbag as a function of the periodically determined occupant velocity to control the occupant deceleration substantially to said desired occupant deceleration.

4. The method as defined in claim 1 wherein the airbag deflation control includes a variable venting aperture, and the method includes the steps of:

establishing a total restraint time from the measured vehicle speed;

determining a desired constant occupant deceleration for bringing the occupant to rest within the total restraint time; and controlling deflation of the airbag by varying the venting aperture as a function of the periodically determined occupant velocity to control occupant deceleration substantially to the desired constant deceleration.

5. The method as defined in claim 1 wherein the step of controlling deflation includes:

establishing a target velocity profile with respect to time; and controllably deflating the airbag so that the periodically determined occupant velocity substantially tracks the target velocity profile.

6. The method as defined in claim 1 wherein the step of controlling deflation includes:

establishing a target velocity profile with respect to time;

during a first interval controllably venting the airbag so that the periodically determined occupant velocity substantially tracks the target velocity profile; and during a final interval controllably venting the airbag so that the periodically determined occupant is lower than the target velocity profile to thereby ensure that the occupant velocity reaches zero during the final interval.

7. The method as defined in claim 1 wherein the step of controlling deflation includes:

establishing a target velocity profile with respect to time;

measuring the acceleration of the passenger compartment;

modifying the target velocity profile as a function of the measured acceleration thereby accounting for a rate of vehicle crush; and controlling deflation of the airbag so that the periodically determined occupant velocity substantially tracks the modified target velocity profile.

8. The method as defined in claim 1 wherein the step of calculating an initial airbag restraining force comprises the steps of:

establishing a table of inflation values as a function of occupant mass and vehicle speed at the time of impact wherein each inflation value corresponds to an initial restraining force; and selecting an inflation value from the table based on the determined occupant mass and the sensed vehicle speed.

9. An airbag system comprising:

at least one airbag mounted in the vehicle opposing a vehicle seat, the airbag having inflation means for variably inflating the airbag to an initial restraining force and means for variably deflating the airbag;

means for sensing vehicle speed at the time of impact;

means for gauging occupant mass;

a controller responsive to the vehicle speed sensing means and to the occupant mass gauging means for determining a desired initial restraining force;

the controller including means for detecting a crash event and for effecting airbag inflation to the desired initial restraining force;

means for periodically determining a velocity of the occupant subsequent to airbag inflation; and means for effecting airbag deflation as a function of the periodically detected occupant velocity so as to decelerate the occupant at a determined rate.

10. The airbag system of claim 9 wherein:

the means for variably deflating the airbag includes an electronically responsive vent control valve; and the means for for effecting airbag deflation includes a microprocessor programmed to calculate a target velocity profile with respect to time, periodically determine said occupant velocity as a function of the sensed vehicle speed and a periodically detected occupant position, and vary an aperture of the vent control valve to substantially conform the determined occupant velocity to the calculated target velocity profile.

11. The airbag system of claim 9 wherein:

the controller includes a microprocessor programmed to select a degree of airbag inflation based on the gauged occupant mass and the sensed vehicle speed; and the means for effecting airbag inflation to the desired initial restraining force comprises the microprocessor having an output commanding inflation in accordance with the selected degree of inflation.

* * * * *